United States Patent
He et al.

(10) Patent No.: US 9,882,386 B2
(45) Date of Patent: Jan. 30, 2018

(54) CONSENSUS-BASED DISTRIBUTED COOPERATIVE CONTROL FOR MICROGRID VOLTAGE REGULATION AND REACTIVE POWER SHARING

(71) Applicant: NEC Laboratories America, Inc., Princeton, NJ (US)

(72) Inventors: Dawei He, Cupertino, CA (US); Ratnesh Sharma, Fremont, CA (US); Di Shi, San Jose, CA (US)

(73) Assignee: NEC Corporation, Tokyo (JP)

( * ) Notice: Subject to any disclaimer, the term of this patent is extended or adjusted under 35 U.S.C. 154(b) by 364 days.

(21) Appl. No.: 14/693,585

(22) Filed: Apr. 22, 2015

(65) Prior Publication Data

US 2015/0311716 A1    Oct. 29, 2015

Related U.S. Application Data (60) Provisional application No. 61/982,951, filed on Apr. 23, 2014.

(51) Int. Cl.
| | |
|---|---|
| *H02J 3/16* | (2006.01) |
| *H02J 3/48* | (2006.01) |
| *H02J 3/50* | (2006.01) |
| *H02J 3/00* | (2006.01) |

(52) U.S. Cl.
CPC .............. *H02J 3/16* (2013.01); *H02J 3/48* (2013.01); *H02J 3/50* (2013.01); *H02J 2003/007* (2013.01); *Y02E 40/34* (2013.01); *Y02E 60/76* (2013.01); *Y04S 40/22* (2013.01)

(58) Field of Classification Search
CPC ........ H02J 3/16; H02J 3/48; H02J 3/50; H02J 2003/007; Y04S 40/22

USPC ................................................. 700/287, 295
See application file for complete search history.

(56) References Cited

U.S. PATENT DOCUMENTS

| | | | | |
|---|---|---|---|---|
| 4,164,661 A | * | 8/1979 | Hucker ..................... | H02J 1/10 307/57 |
| 5,006,781 A | * | 4/1991 | Schultz ..................... | H02P 9/04 307/87 |
| 2006/0119325 A1 | * | 6/2006 | Mrowiec .................. | H02J 3/44 322/22 |

(Continued)

OTHER PUBLICATIONS

L. Y. Lu, "Consensus-based P-f and Q-V droop control for multiple parallel-connected inverters in lossy networks," 2013 IEEE International Symposium on Industrial Electronics, Taipei, Taiwan, 2013, pp. 1-6. doi: 10.1109/ISIE.2013.6563865 [retrieved from internet on Jun. 15, 2017]<URL: http://ieeexplore.ieee.org/stamp/stamp.jsp?tp=&arnumber=6563865&i.*

(Continued)

*Primary Examiner* — Sean Shechtman
*Assistant Examiner* — Mohammed Shafayet
(74) *Attorney, Agent, or Firm* — Joseph Kolodka (57) ABSTRACT

A controller used in microgrid systems that includes a primary control module and a secondary control module. The primary control module may employ a primary consensus control to control at least one of a real power and reactive power sharing in at least one distributed generator system of a microgrid. The secondary control module may employ a secondary consensus control to maintain at least one of voltage and frequency in the microgrid to a nominal value.

19 Claims, 7 Drawing Sheets

(56) References Cited

U.S. PATENT DOCUMENTS

| | | | | |
|---|---|---|---|---|
| 2006/0244426 A1* | 11/2006 | Wu | ........................ | H02M 7/217 323/207 |
| 2008/0211464 A1* | 9/2008 | Ponnaluri | ............. | H02M 7/493 323/207 |
| 2009/0108676 A1* | 4/2009 | Algrain | .................... | H02J 3/42 307/73 |
| 2010/0060377 A1* | 3/2010 | Takahashi | ...... | H03K 19/018507 333/103 |
| 2012/0049638 A1* | 3/2012 | Dorn | ......................... | H02J 3/42 307/87 |
| 2012/0089270 A1* | 4/2012 | Dozier | ..................... | H02J 3/38 700/295 |
| 2012/0101639 A1* | 4/2012 | Carralero | .................. | G06F 1/26 700/286 |
| 2013/0073109 A1* | 3/2013 | Cheng | ....................... | H02J 3/40 700/298 |
| 2013/0184894 A1* | 7/2013 | Sakuma | .................... | H02J 3/12 700/298 |
| 2014/0097683 A1* | 4/2014 | Piyabongkarn | ........... | H02J 3/32 307/26 |
| 2014/0111167 A1* | 4/2014 | Hyypio | ..................... | H02P 9/14 322/20 |
| 2014/0265354 A1* | 9/2014 | Folken | ...................... | H02P 9/42 290/40 E |

OTHER PUBLICATIONS

Sao, Charles K., "Control and Power Management of Converter Fed Microgrids," IEEE Transactions on Power Systems, vol. 23, No. 3, Aug. 2008. (pp. 1088-1098).

Sao, Charles K., "Autonomous Load Sharing of Voltage Source Converters," IEEE Transactions on Power Delivery, vol. 20, No. 2, Apr. 2005. (pp. 1009-1016).

\* cited by examiner

CONSENSUS-BASED DISTRIBUTED COOPERATIVE CONTROL FOR MICROGRID VOLTAGE REGULATION AND REACTIVE POWER SHARING

RELATED APPLICATION INFORMATION

This application claims priority to provisional application Ser. No. 61/982,951 filed on Apr. 23, 2014, which is incorporated herein by reference.

BACKGROUND

Technical Field

The present disclosure relates to microgrid voltage regulation. More particularly, the present disclosure is related to microgrid voltage regulation in connection with distributed generation units.

Description of the Related Art

An increasing number of distribution generation and energy storage are being introduced to the distribution level. Together, they are typically identified as distributed generation (DG) units. Distributed generation (DG) units typically include micro-turbines, fuel cells, photovoltaic systems, wind energy systems, and related systems. These sources are placed at customers sites. They are low cost, low voltage and have high reliability with few emissions. To meet the needs of its customers, as well as the utilities in local area, the microgrid provides a new paradigm for defining the operation of distributed generation.

SUMMARY

The present disclosure provides a controller used in microgrid systems that includes a primary control module and a secondary control module. The primary control module employs a primary consensus control using at least one hardware processor to control at least one of real power and reactive power sharing in at least one distributed generation system of a microgrid. The primary consensus control exchanges reactive power information between each neighboring distributed generator in the microgrid so that each distributed generator has a proportion of total power in the microgrid. The secondary control module employs a secondary consensus control including at least one hardware processor to maintain at least one of voltage and frequency in the microgrid to a nominal value.

In another aspect, the present disclosure provides a method for controlling a microgrid system which includes controlling at least one of real power and reactive power amongst distributed generation systems of a microgrid using a primary consensus control. The primary consensus control employs at least one hardware processor to exchange reactive power information between each neighboring distributed generator of the microgrid so that each distributed generator has a proportion of total power in the microgrid. The method may further include maintaining a nominal value of at least one of voltage and frequency in the microgrid using a secondary consensus control.

In yet another aspect of the present disclosure, a computer program product is provided that controls a microgrid system. In some embodiments, the computer program product includes a non-transitory computer readable storage medium having computer readable program code embodied therein for a method of controlling a microgrid system. The method executed by the computer program product includes controlling at least one of real power and reactive power amongst distributed generation systems of a microgrid using a primary consensus control, and maintaining a nominal value of at least one of voltage and frequency in the microgrid using a secondary consensus control. The primary consensus control employs at least one hardware processor to exchange reactive power information between each neighboring distributed generator of the microgrid so that each distributed generator has a proportion of total power in the microgrid.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present disclosure is related to employing hierarchical control strategy in microgrid applications. A microgrid is a small-scale power grid that can operate independently or in conjunction with the area's main electrical grid. It can be a group of interconnected loads and distributed energy resources (DER) with clearly defined electrical boundaries that act as a single controllable entity with respect to the area's main electrical grid [and can] connect and disconnect from the grid to enable it to operate in both grid connected or island mode.

Distributed energy resource (DER) systems are small-scale power generation or storage technologies (typically in the range of 1 kW to 10,000 kW) used to provide an alternative to, or an enhancement of, the traditional electric power system. DER systems also serve as storage device and are often called Distributed energy storage systems (DESS). The distributed energy resources, which may also be referred to as distributed generation systems (DGs), typically use renewable energy sources, including, but not limited to, hydro power, e.g., wave power; biomass and biogas, e.g., methane producing bio products and waste (including waste to gas power); solar power, e.g., photovoltaics; wind power, e.g., wind turbine, geothermal power and cogeneration using steam turbines, natural gas-fired fuel cells, micro-turbines or reciprocating engines to turn generators. In addition to natural gas-based schemes, distributed energy projects can also include other renewable or low carbon fuels including biofuels, biogas, landfill gas, sewage gas, coal bed methane, syngas and associated petroleum gas. Energy storage in the DER system, also referred to as DGs system, may be provided by several types of battery, photovoltaic storage, pumped hydro, compressed air, and thermal energy storage.

The hierarchical control strategy that is used for microgrid applications typically includes a primary control and a secondary control. The "primary control", e.g., primary droop control, realizes the real power and reactive power sharing amongst distributed generations (DGs). The term "distributed generation" may refer to any sort of power generation resource that is dispersed in the distribution system. The "secondary control" is responsible for restoring the voltage and frequency in the microgrid back to their nominal values. In one example, the nominal value of the voltage and frequency is a 1.0 pu for voltage and 60 Hz for frequency (for the US grid). During disturbances, the grid voltage and frequency will deviate from the nominal values due to various reasons. This secondary control can help restore the voltage and frequency back to their nominal values.

However, it has been determined that a typical hierarchical strategy bears some limitations. For example, the accuracy of the reactive power sharing can be low, because the output voltage of each inverter is rarely the same in a network based system. Additionally, the R/X (line resistance/line reactance) ratio should not be neglected in microgrid applications, which downgrade the performance of typical reactive power-voltage magnitude (Q-V) droop control and real power-frequency (P-F) droop control. Further, high band communication (HBC) is required for secondary control, which can be costly and a fragile solution in a network based system.

The methods, systems and computer program products that are disclosed herein introduce a consensus control into both promoted reactive power-voltage magnitude (Q-V) droop control and secondary control, which in some embodiments provides the real and reactive power sharing, as well as the critical bus (PCC) voltage and frequency substantially simultaneously. In some embodiments, a same low bandwidth communication channel is used by both the primary control, e.g., primary droop control, and the secondary control. In accordance with some embodiments of the present disclosure, the control strategy disclosed herein can overcome the difficulties of accurate reactive power sharing in a network based application. Further, in some embodiments, the proposed consensus reactive power-voltage magnitude (Q-V) droop control mitigates the influence of a high R/X (line resistance/line reactance) ratio on the dynamic performance of the reactive power sharing, only if it is not a purely resistive network.

In some embodiments, the proposed solution saves communication costs, which can be applied for voltage regulation in the microgrid and improves the plug and play flexibility of distributed generations into the microgrid. In some embodiments, the methods disclosed herein can identify how to accurately share reactive power among the distributed generations (DGs) in the network based system, and identifies how to regulate the voltage with minimum communication requirements.

It should be understood that embodiments described herein may be entirely hardware or may include both hardware and software elements, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The methods, systems and computer products that are disclosed herein employ a consensus based hierarchical control algorithm of DGs for voltage regulation, which provides for reactive power sharing in a network base system; provides voltage and frequency regulation with a sparse communication system; and allows for implementation in a 3-phase unbalance lossy network. For example, a consensus based droop control algorithm is proposed to realize reactive power sharing.

Consensus control is a theory at the intersection of systems theory and graph theory. Networks of agents that exchange information with each other will reach equilibrium. Consensus algorithms try to solve the problem of a number of processes agreeing on a common decision. In some embodiments, a consensus protocol must satisfy the four formal properties, such as termination, validity, integrity and agreement. For example, in termination every correct process decides some value. For validity, if all processes propose the same value v, then every correct process decides v. For example, in integrity every correct process decides at most one value, and if it decides some value v, then v must have been proposed by some process. For agreement, if a correct process decides v, then every correct process decides v.

Figure 1:
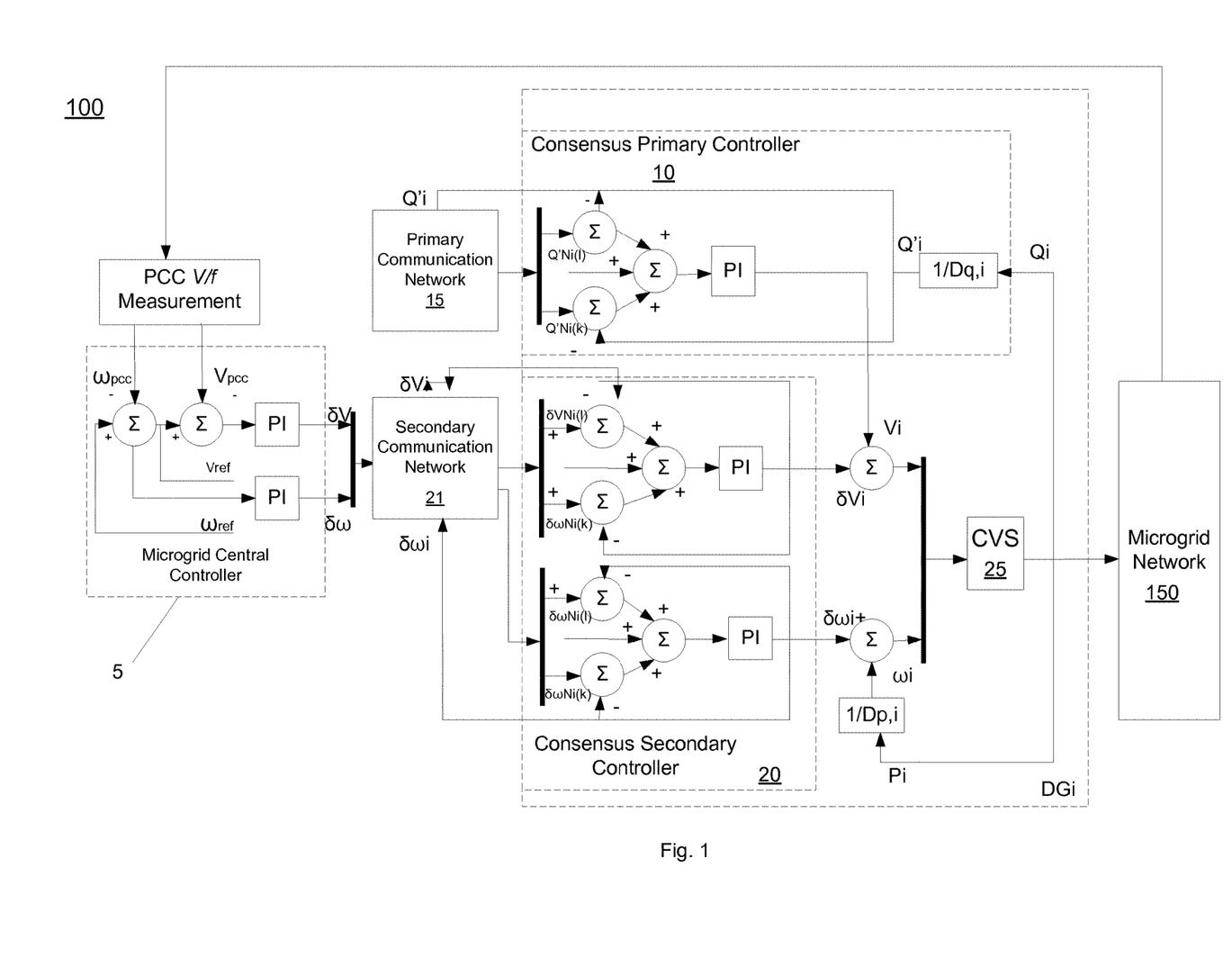
FIG. 1 is a block diagram of a consensus hierarchal control as employed in a microgrid application, in accordance with one embodiment of the present disclosure.

FIG. 1 is a block diagram of a consensus hierarchal control 100 as employed applied to a microgrid network 150. Each Σ that is depicted in FIG. 1 identifies a summation. This symbol illustrates an output as a summation of multiple inputs. In some embodiments, the present disclosure provides a consensus hierarchal controller 100 used in microgrid systems that includes microgrid central controller 5, a primary control module that can provide a consensus primary controller 10 and a secondary control module that can provide a consensus secondary controller 20. Each of the microgrid central controller 5, the consensus primary controller 10 and the consensus secondary controller 20 may include at least one proportion integral (PI) controller.

The microgrid central controller 5 typically includes an input from a critical bus (PCC), i.e., point of common couple (PCC), that provides a frequency value ωpcc for the microgrid 150 and a voltage value Vpcc for the microgrid. The microgrid central controller considers the frequency value ωpcc and the voltage value Vpcc in combination with a reference voltage Vref and a reference frequency ωref. From the combination of the voltage value Vpcc for the microgrid, reference voltage Vref, the microgrid controller computes a secondary control signal δV. The secondary control signal δV is sent across a secondary communication network 21 to the consensus secondary controller 20.

The secondary control module employs a secondary consensus controller 20 including at least one hardware processor to maintain at least one of voltage V and frequency ω in the microgrid network 150 to a nominal value. The secondary consensus controller 20 also employs a local secondary control variable $\delta V_i$ whose dynamics is designed to track the central secondary control signal δV. In some embodiments, an input to the consensus secondary controller 20 is the active power output $P_i$ from the consensus primary controller 10, which is converted to the multiplicative inverse of the active power droop coefficient $D_{p,i}$. Signal from the secondary consensus controller is sent through controlled voltage sources (CVS) 25 to the microgrid network 150.

The primary control module employs a primary consensus control 10 using at least one hardware processor to control at least one of a real power and reactive power sharing in at least one distributed generation system DGi of the microgrid network 150. The primary consensus control may be integrated into a reactive power voltage (Q-V) droop control. In some embodiments, the primary consensus control exchanges reactive power information between each distributed generator of the microgrid and a neighboring distributed generator of the microgrid to ensure that reactive power sharing between each distributed generator of the microgrid is exact so that each distributed generator within the microgrid has an equal proportion of total power. The primary consensus control may also exchange a droop coefficient of each distributed generator and a neighboring distributed generator of the microgrid. The input to the primary consensus control 10 may be the reactive power output $Q_i$, which may be converted to the multiplicative inverse of the reactive power droop coefficient $D_{q,i}$, and can be communicated from the secondary consensus control 20, as depicted in FIG. 1. In some embodiments, communication to the consensus primary controller 10 is through a primary communication network 15.

As will be described below, the consensus control may be configured for use in a consensus based droop control. In this application, the consensus protocol exchanges reactive power information between each neighboring distributed generator of a microgrid, as well as exchanging the droop coefficient of each distributed generator with neighboring generators. This mechanism provides that reactive power sharing between neighbors is exact. Each distributed generator has an exact proportion of total power. The power for each distributed generator is proportional to its power generation capability. The overall voltage and frequency in the microgrid is impacted by sharing amongst the distributed generators. The second control brings the voltage and frequency and back to a preconceived standard, i.e., nominal value. The second control also employs a consensus control. The consensus control in the secondary includes exchanging voltage at each distributed generator with its neighbor. One example of a nominal level for voltage in the microgrid is about 1 volt per unit for each distributed power generation, and the frequency is around 60 hz.

In the following description a number of equations are described, e.g., Equations (1)-(12). The following list of nomenclature is suitable for the variables of the following equations:

$V_i$=Magnitude of output voltage of the ith distributed generator (DG).
$f_i$=Output frequency of the ith DG.
$D_{p,i}$=Multiplicative inverse of the active power droop coefficient for the ith DG.
$D_{q,i}$=Multiplicative inverse of the reactive power droop coefficient for the ith DG.
$Q_i$=Initial reference reactive power output of the ith DG.
$P_i$=Initial reference active power output of the ith DG.
$Q_i$=Reactive power output of the ith DG.
$P_i$=Active power output of the ith DG.
$V_{cb}$=Voltage magnitude at the critical bus.
k=Constant in simplified power flow equations.
$V_{std}$=Nominal voltage of the microgrid.
$I_i$=The set of local information that DG i's controller can obtain without any communication links without other DGs.
$N_i$=Neighboring buses of bus I (the set of buses that can send signals to bus i)
L=Laplace matrix of the communication graph.

$$D = D = \text{diag}\left(\frac{1}{D_{q,1}}, \ldots, \frac{1}{D_{q,n}}\right).$$

$Q=[Q_1\ Q_2\ \ldots\ Q_N]^T$
δV=Secondary control signal calculated at the central controller (CC).
$k_p$=Proportional gain at the CC PI controller.
$k_I$=Integral gain at the CC PI controller.
$\delta V_i$=Local secondary control variable whose dynamics is designed to track the central secondary control signal δV.
$b_i$=A binary variable indicating whether node i is a leading node in the consensus network.

Figure 2:
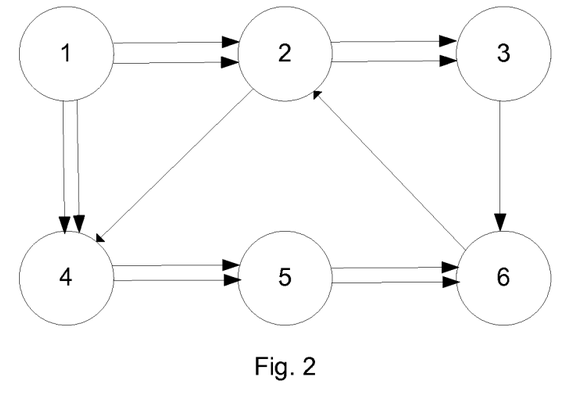
FIG. 2 is a schematic illustrating a consensus control system without control nodes in accordance with some embodiments of the present disclosure.

FIG. 2 depicts one embodiment of a consensus control system without control nodes. A directed graph G={N,ϵ} with nodes N={1, . . . , n} and edges ϵ may be employed in accordance of with one embodiment of a consensus control system. Each node represents an agent, and each node (i, j)(pointing from j to i) represents that information that can flow from j to i. The neighbors of the agent i can be defined as $N_i=\{j \in N: (i,j) \in \epsilon\}$. Under this definition, an agent i has access to information of only his neighbor $N_i$. Then, the adjacency matrix $A=[a_{ij}] \in \mathbb{R}^{n \times m}$ associated with the graph G is defined where $a_{ji}=1$ if $(j,i) \in \epsilon$ and $a_{ij}=0$. So the Laplace matrix $L=[l_{ij}] \in \mathbb{R}^{n \times m}$ associate with the graph G, where $l_{ij}=-a_{ij}$ when $i \neq j$ and $l_{ii}=\Sigma_{j=1,j \neq i}^n a_{ij}$. From the above, a (directed) spanning tree of G as a sub-graph of G is defined, which is a meanwhile (directed) tree that connects all the nodes in G, as shown in FIG. 2.

To provide a first order consensus control, each agent (node) is set as a single state system characterized by $\dot{x}=u_i$, where $u_i$ is the input as a function of agent i's neighboring states $x_j$, $j \in N_i$. The consensus control problem is to solve $u_i$ such that all states $x_i$ will converge to a common equilibrium point. In some embodiments, this can be provided by adopting the consensus protocol:

$\dot{x}_i=u_i=\Sigma_{j \in N_i} a_{ij}(x_j-x_i)$       Equation (1)

It can then be derived that the entire system can be written as $\dot{w}=-Lx$, where L is the Laplace matrix of the communication graph. In some embodiments, consensus can only be reached if and only if there exists a spanning tree in the communication graph G; where at this time, the Laplace matrix has a simple zero eigenvalue and all the other eigenvalues have positive real parts, which may be referred to as Theorem 1.

In some embodiments, a consensus control protocol design may be provided. In some embodiments, in view of Equation (1), all $x_i$ is driven to be identical by setting the derivate of $x_i$ to be the consensus protocol $u_i=\Sigma j \in N_i(x_j-x_i)$. The protocol of the present disclosure is set to drive all $$\frac{Q_i}{D_{q,i}}$$

to be identical (in this way $Q_i$ will be proportional to $D_{q,i}$). In this manner, a straightforward control design would be substitute the $x_i$ in Equation (1) to $$\frac{Q_i}{D_{q,i}}.$$

In one embodiment, the consensus control protocol design includes the following:

$$\frac{\dot{Q}_i}{D_{Q,i}} = \sum_{j \in N_i} \left( \frac{Q_j}{D_{q,j}} - \frac{Q_i}{D_{q,i}} \right) \quad \text{Equation (2)}$$

In some embodiments, a consensus droop control may be provided. In Equation (1), it is typically required that $x_i$ can be directly controlled, while $Q_i$ cannot because the inverters area usually operating in voltage-frequency (V-f) mode, in which the voltage and frequency are directly regulated/controlled. Thus, a modification to (1) is made based on the droop characteristics, as follows:

$$V=V_0-k_p(Q-Q_0) \quad \text{Equation (3)}$$

In some embodiments, in a following step, the control protocol $$u_i = \sum_{j \in N_i} \left( \frac{Q_j}{D_{q,j}} - \frac{Q_i}{D_{q,i}} \right)$$

is set to a controllable quantity $\dot{V}_i$ instead of $$\frac{\dot{Q}_i}{D_{q,i}}.$$

This yields the following proposed control algorithm, i.e., consensus droop control:

$$\dot{V}_i = \sum_{j \in N_i} \left( \frac{Q_j}{D_{q,j}} - \frac{Q_i}{D_{q,i}} \right) \quad \text{Equation (4)}$$

The consensus droop control can attain the same effects as Equation (1): driving $$\frac{Q_i}{D_{q,i}}$$

to be identical. Proof of the above may be divided into two parts: first to prove the equilibrium point of Equation (4), satisfies that all $$\frac{Q_i}{D_{q,i}}$$

are identical, and second to prove that the equilibrium point is an asymptotoically stable one. First, the equilibrium point of the Equation (4) is derived. Setting all derivative terms in Equation (4) to 0, then:

$$\sum_{j \in N_i} \left( \frac{Q_j}{D_{q,j}} - \frac{Q_i}{D_{q,i}} \right) = 0 \quad \text{Equation (5)}$$

which is equivalent to:

$$LDQ=0 \quad \text{Equation (6)}$$

Where L is the Laplacian matrix of the communication graph, $$D = \text{diag}\left( \frac{1}{D_{q,1}}, \ldots, \frac{1}{D_{q,n}} \right)$$

and $Q=[Q_1 \; Q_2 \; \ldots \; Q_N]^T$. Because the communication graph has a spanning tree, according the Theorem 1, the rank of L is n−1. Therefore, $x=(1, \ldots, 1)^T$ is a solution of $Lx=0$. Thus, the solution of equation (6) may be $DQ=H(1, \ldots, 1)^T$, $H \in \mathbb{R}$. In some embodiments, the equilibrium point of Equation (4) is:

$$\frac{Q_t}{D_{q,i}} = H, \forall i \quad \text{Equation (7)}$$

In which, all $$\frac{Q_t}{D_{q,i}}$$

are identical.

The second part of the proof (asymptotically stability) is given in the additional information that is provided in the appendix to the application entitled, "Additional Information", under the section titled "APPENDIX".

In some embodiments, the methods, systems and computer program products employ a consensus based secondary algorithm to regulate voltage and frequency of the critical buss (PCC).

Figure 3:
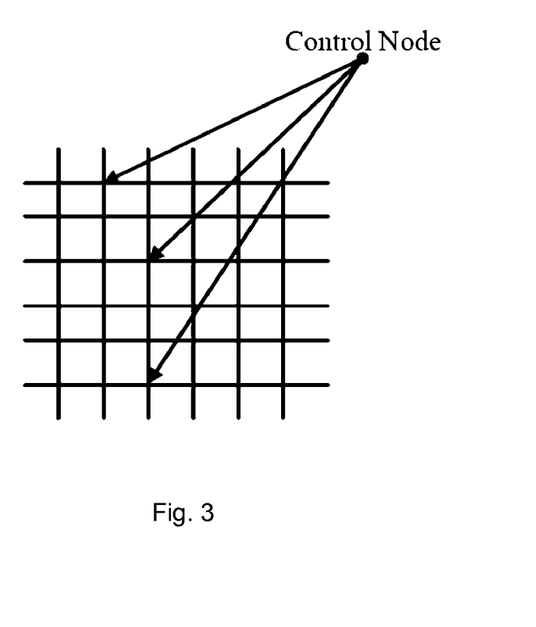
FIG. 3 is a plot of a consensus control system with a control node, in accordance with some embodiments of the present disclosure.

In some embodiments, a consensus control with leading node algorithm is introduced by the present disclosure. The system states can be required to converge to a desired external control input rather than some initial dependent value. In some embodiments, this may be achieved by providing a control node as depicted in FIG. 3. The control node may deliver a control signal v to a subset of nodes B in the system. The state of the function may be updated to provide the following:

$$\dot{x}_i = u_i = \Sigma_{j \in N_i} a_{ij}(x_j - x_i) + b_i(v - x_i) \quad \text{Equation (8)}$$

where $b_i=1$ if $i \in B$ and $b_i=0$ otherwise. In some embodiments, all agents states will converge to external control signal v if the graph G has a spanning tree with its root node i satisfying $i \in B$, which may be referred to as Theorem 2.

The methods, systems and computer program products that are disclosed herein also include a secondary control and protocol design. The consensus control from Equation (5) enables sending a control signal v to a set of networked agents with only sparse communication links. Therefore, a consensus based secondary send can be written as Equation (9), which enables the consensus control to send δV (the output of the PI control at the central controller) to all DGs. Equation (9) is as follows:

$$\delta \dot{V}_i = \Sigma_{j \in N_i}(\delta V_j - \delta V_i) + b_i(\delta V - \delta V_i) \quad \text{Equation (9)}$$

where δV is the leading control signal calculated, δVi is the local control signal that tracks the leading signal δV through consensus protocol, i.e., Equation (9), and $b_i=1$ for the DGs with direct communication to the leading node and $b_i=0$, elsewhere. Equation (9) has the same form as Equation (8). Therefore, according to Theorem 2, i.e., all agents states will converge to external control signal v if the graph G has a spanning tree with its root node i satisfying $i \in B$, all local control signals δVi will converge δV if and only if the communication graph is a spanning tree with its root having direct communication to the leading node. In this way, the proposed method greatly reduces cost in communication infrastructure.

In some embodiments, the methods, systems and computer program products disclosed herein provide a consensus secondary control. In a traditional second control, the leading control signal δV is usually calculated through a proportion integral (PI) controller as shown in Equation (10), which is follows:

$$\delta V = k_p(V_{std} - V_{pcc}) + k_i \int (V_{std} - V_{pcc}) dt \quad \text{Equation (10)}$$

Adding the secondary control signal δVi into Equation (9), and the primary control signal $V_i$ in Equation (4), the final consensus control signal is Equation (11), which is shown as follows:

$$\dot{V}_{ref,i} = \dot{V}_i + \delta \dot{V}_i \quad \text{Equation (11)}$$

$$\dot{V}_{ref,i} = \sum_{j \in N_i}\left(\frac{Q_j}{D_{q,j}} - \frac{Q_i}{D_{q,i}}\right) + \sum_{j \in N_i}(\delta V_j - \delta V_i) + b_i(\delta V - \delta V_i)$$

A block diagram of the proposed consensus hierarchical control is shown in FIG. 1.

Typically, voltage regulation and power sharing for an unbalanced network with R/X ratio should not be overlooked. The ways to control DGs in microgrid arrangements are typically described in a three-phase balanced single bus system. However, it has been determined that it is more realistic to control DGs in an unbalanced network, because of the unbalanced power usage in the microgrid. In this disclosure, a sequence analysis based droop and secondary control is proposed to control DGs in an unbalanced situation.

To deal with the load unbalance problem in a 3-phase unbalanced network. A sequence analysis is proposed herein, in which the overall analysis is discussed in the stationary (αβ) reference frame, therefore if a three phase three-wire island microgrid is considered, the zero-sequence voltage drops will not affect system voltages. In some embodiments, the calculation of the active power output P and the reactive power output Q can be given as follows:

$$p^+ = v_{o\alpha}i_{o\alpha} + v_{o\beta}i_{o\beta}$$

$$q^+ = v_{o\alpha}i_{o\alpha} - v_{o\beta}i_{o\beta}$$

$$q^+ = v_{o\alpha}^- i_{o\alpha}^- - v_{o\beta}^- i_{o\beta}^- \quad \text{Equation (12)}$$

Figure 4:
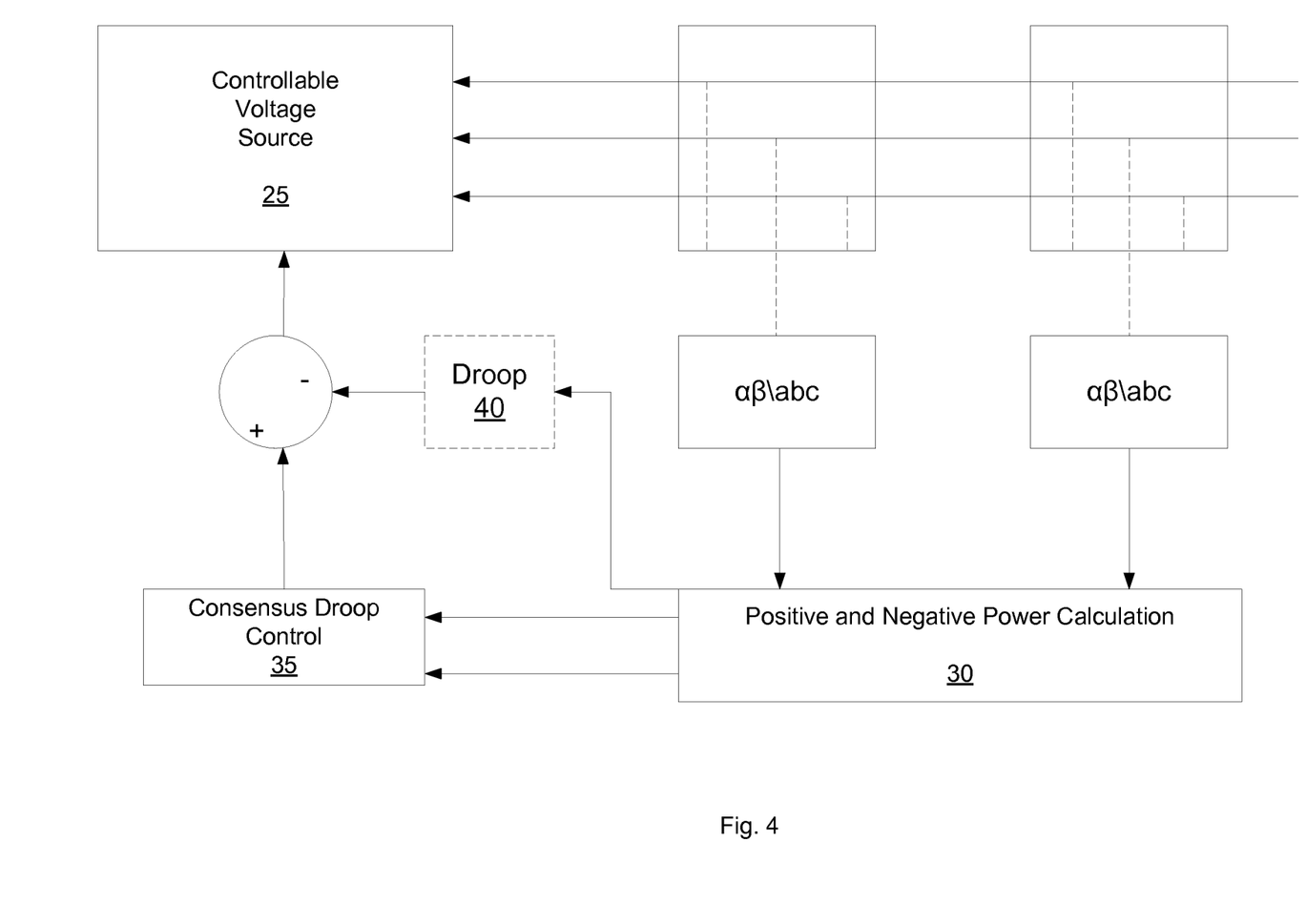
FIG. 4 illustrates one embodiment of a control block employed in microgrid application, in accordance with one embodiment of the present disclosure.

One embodiment of a control block in accordance with the present disclosure is depicted in FIG. 4. The control block typically includes a controllable voltage source (CVS); a module for positive and negative power calculation 30, in accordance with Equation (12); a droop module 40; and a consensus droop control module 35. In some embodiments, the negative sequence compensation can be overlooked with the unbalanced network is run in a stable state.

Figure 5:
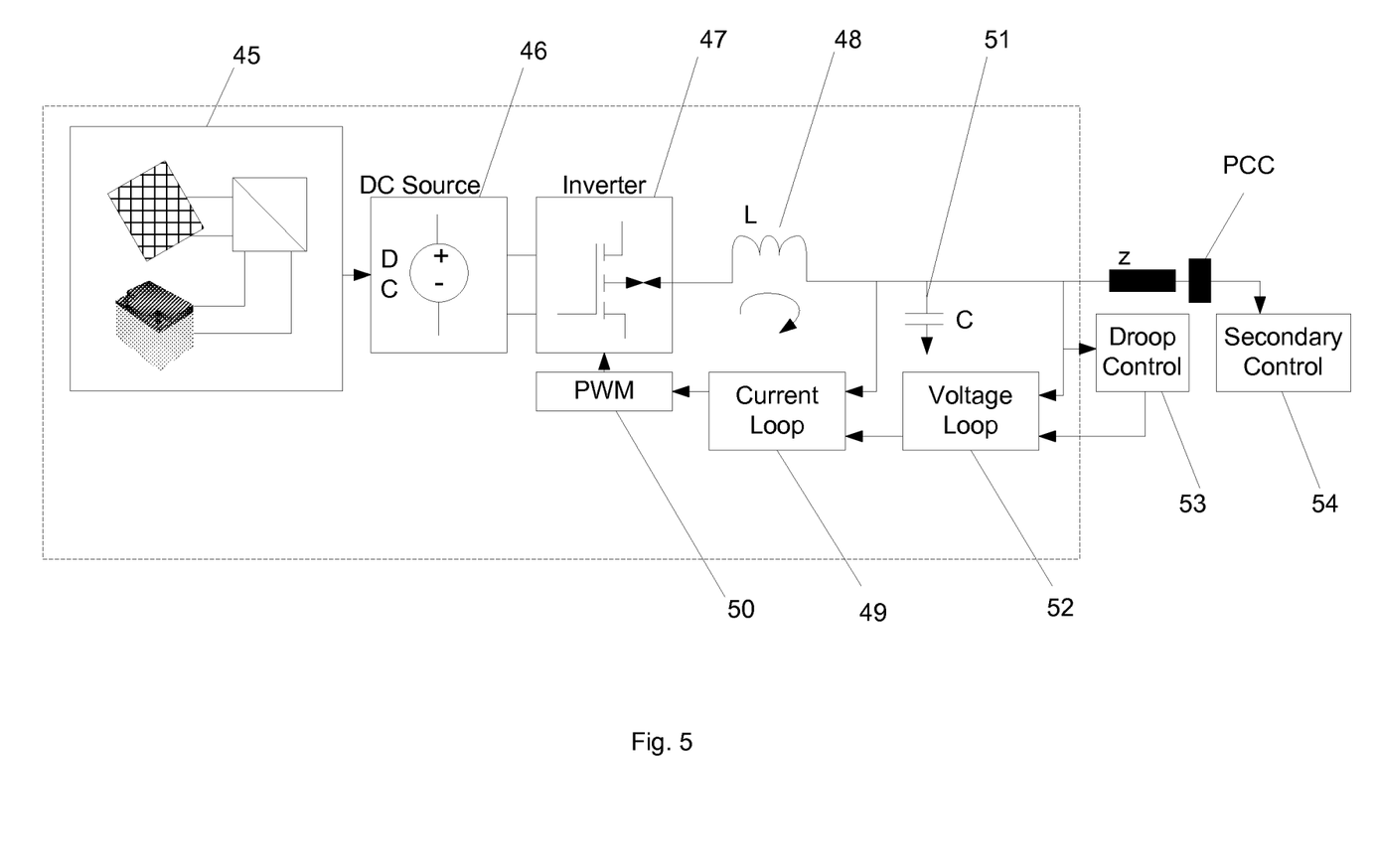
FIG. 5 is a block diagram of a dynamic control model of an inverter, in accordance with one embodiment of the present disclosure.

A standard dynamic control model of an inverter is depicted in FIG. 5. The dynamic control model typically includes a power source 45, (also referred to as distributed generator DG) such as a solar power source, and a power storage device, such as a battery. The dynamic control model includes a DC source 46, and an inverter 47. An inductor L may follow the inverter 47. A current loop 49 may include the inverter 47, the inductor 48, as well as the pulse width modulation (PWM) module 50. A voltage loop 52 may follow the current loop 49, and may include a capacitor 51. The power source 45, the DC source 46, the inverter 47, the control loop 49, inductor 48, PWM 50, voltage loop 52, and capacitor 51 are all components of one embodiment of a controlled voltage source (CVS). The controlled voltage source (CVS) may be connected to a droop control 53 and a secondary control 54. One embodiment of the droop control 53 has been described above as the primary consensus control (also referred to as primary control module), and one embodiment of the secondary control 54 has been described above as the secondary consensus control (also referred to as secondary control module). A critical bus, i.e., point of common couple, may also be present with the droop control 53 and the secondary control 54.

Figure 6:
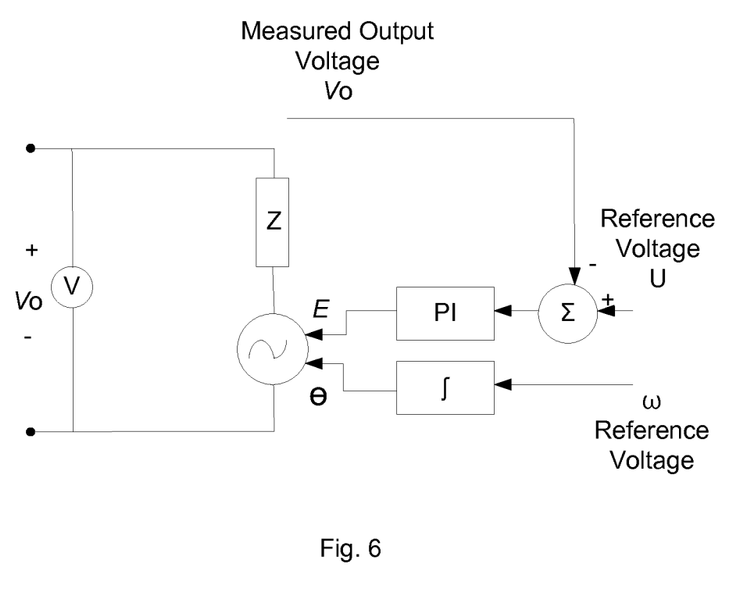
FIG. 6 is a circuit diagram of the dynamic control model of the inverter that is depicted in FIG. 5.

In some embodiments, the dynamic control model may include an inner loop current controller, and inner loop voltage controller, and external loop active power and reactive power droop controller, and a system level secondary controller. In some embodiments, the two inner lops controllers will not be considered, because its response time is very fast and it will not influence the following control loops. In some embodiments, the inverters are considered as the controllable voltage sources (CVSs) whose output voltages and frequency are identical to the given control signals. The equivalent circuits for the structure depicted in FIG. 5 are depicted in FIG. 6.

Figure 7:
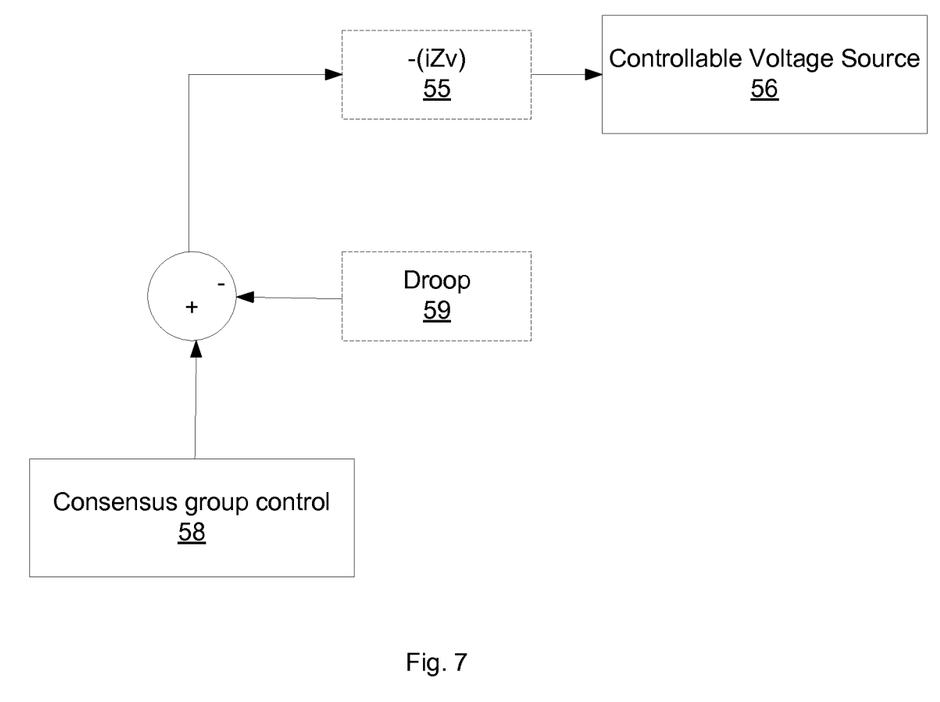
FIG. 7 is a block diagram depicting the use of virtual impedance, in accordance with the present disclosure.

Virtual impedance is usually to adjust the R/X influences and mitigate the asymmetrical line impedance. In addition, the virtual inductance is considered to make the DG output impedance more inductive to improve the decoupling of real and reactive power. Therefore, the virtual impedance enhances the performance and stability of droop controllers. The virtual impedance is implemented as shown in FIG. 7, where $Z_v$ 55 is the positive sequence virtual impedance and the virtual impedance is performed prior to the controllable voltage source 56. The virtual impedance schematic depicted in FIG. 7 may further include a consensus droop control 58 and droop 59. These features have been described above.

In some embodiments, the methods, systems and computer program products that are disclosed herein provide a hierarchical control strategy in microgrid applications that share reactive powers accurately amongst distributed generators by using consensus droop control. Additionally, the methods, systems and computer program products that are disclosed herein regulate voltage and frequency in the microgrid using consensus control. The methods disclosed herein also control the distributed generators in an unbalanced microgrid. Additionally, the methods, systems and computer program products of the present disclosure improve the control performance by using virtual impedance to overcome the high R/X ratio.

Figure 8:
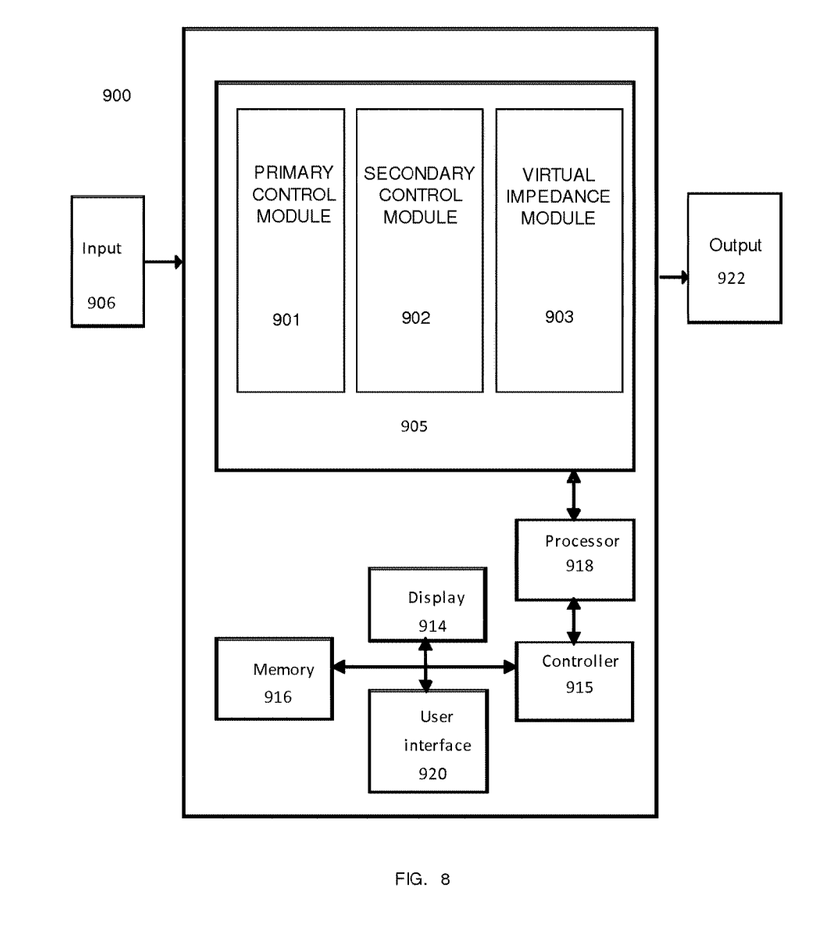
FIG. 8 is a block diagram of an exemplary system for use in microgrid control, in which consensus control theory is introduced into both promoted Q-V droop control and secondary control, in accordance with the present disclosure.

In another aspect of the present disclosure, a system for use in microgrid control, in which consensus control theory is introduced into both promoted Q-V droop control and secondary control, that substantially guarantees accurate real and reactive power sharing amongst distributed generators (DGs) in a network based microgrid system, as well as simultaneously regulating at least one of voltage and frequency of the microgrid, as depicted in the block diagram this is provided by FIG. 8. In one embodiment, a controller 900 used in microgrid systems is provided that includes a plurality of modules 905, which include at least a primary control module 901 and a secondary control module 902.

The primary control module 901 employs a primary consensus control to control at least one of a real power and reactive power sharing in at least one distributed generator of the microgrid. The functions of the primary control module 901 have been described above with reference to FIGS. 1-7. For example, some of the functions of the primary control module 901 have been described above in the description of the consensus primary controller 10 described above with reference to FIG. 1. In some embodiments, the primary consensus control of the primary control module 901 is integrated into a reactive power voltage (Q-V) droop control. The primary consensus control may exchange reactive power information between each distributed generator of the microgrid and a neighboring distributed generator of the microgrid to ensure that reactive power sharing between each distributed generator of the microgrid is exact so that each distributed generator within the microgrid has an equal proportion of total power. In some embodiments, the primary consensus control exchanges a droop coefficient of each distributed generator and a neighboring distributed generator of the microgrid.

The secondary control module 902 employs a secondary consensus control to maintain at least one of voltage and frequency in the microgrid to a nominal value. The functions of the secondary control module 902 have been described above with reference to FIGS. 1-7. For example, some of the functions of the secondary control module 902 have been described above in the description of the consensus secondary controller 20 described above with reference to FIG. 1. In some embodiments, the secondary control module 902 exchanges voltage information at each distributed generator with its neighboring distributed generator within the microgrid.

In some embodiments, the modules 905 of the system may further include a virtual impedance module 903. In some embodiments, the virtual impedance module 903 adjusts the R/X influences, and mitigates the asymmetrical line impedance.

In one embodiment, the system 900 preferably includes one or more processors 918, e.g., hardware processor, and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 900 may include one or more displays 914 for viewing. The displays 914 may permit a user to interact with the system 900 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 900 may receive input data 906 which may be employed as input to a plurality of modules 905. The system 900 may produce output data 912, which in one embodiment may be displayed on one or more display devices 914. It should be noted that while the above configuration is illustratively depicted, it is contemplated that other sorts of configurations may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A controller used in microgrid systems comprising:
a primary control module configured to employ a primary consensus control including at least one hardware processor to control at least one of a real power and reactive power sharing in at least one distributed generator of a microgrid, wherein the primary consensus control exchanges reactive power information between each neighboring distributed generator in the microgrid so that said each distributed generator has a proportion of total power in the microgrid;

wherein the primary consensus control comprises a control algorithm:

where $\dot{V}_i$ is a magnitude of output voltage for an ith distributed generator, $N_i$ is neighboring buses of bus i, $Q_j$ reactive power output at a jth distributed generator, $Q_i$ reactive power output at an ith distributed generator, $D_{q,i}$ is the multiplicative inverse of the reactive power droop coefficient for the ith distributed generator, and $D_{q,j}$ is the multiplicative inverse of the reactive power droop coefficient for the jth distributed generator; and a secondary control module configured to employ a secondary consensus control to maintain at least one of voltage and frequency in the microgrid to a nominal value.

2. The controller of claim 1, wherein the primary consensus control is integrated into a reactive power voltage (Q-V) droop control.

3. The controller of claim 1, wherein the primary consensus control exchanges said reactive power information between said each distributed generator of the microgrid and a neighboring distributed generator of the microgrid to ensure that said reactive power sharing between said each distributed generator of the microgrid is exact so that each distributed generator within the microgrid has an equal proportion of said total power of the microgrid.

4. The controller of claim 1, wherein the primary consensus control exchanges a droop coefficient of each distributed generator and a neighboring distributed generator of the microgrid.

5. The controller of claim 1, wherein the at least one distributed generator of a microgrid causes fluctuation of the voltage and frequency in the microgrid, and the secondary consensus control restores at least one of voltage and frequency in the microgrid to said nominal value that is preset.

6. The controller of claim 1, wherein the secondary control module exchanges voltage information at each distributed generator with its neighboring distributed generator within the microgrid.

7. The controller of claim 1, wherein the secondary consensus control comprises a consensus control signal:

$$\dot{V}_{ref,i} = \dot{V}_i + \delta \dot{V}_i,$$

$$\dot{V}_{ref,i} = \sum_{j \in N_i} \left( \frac{Q_j}{D_{q,j}} - \frac{Q_i}{D_{q,i}} \right) + \sum_{j \in N_i} (\delta V_j - \delta V_i) + b_i(\delta V - \delta V_i)$$

wherein $V_i$ is a magnitude of output voltage of the ith distributed generator (DG), $D_{q,j}$ is a multiplicative inverse of the reactive power droop coefficient for the jth DG, $D_{q,i}$ is a multiplicative inverse of the reactive power droop coefficient for the ith DG, $V_{ref}$ is a nominal voltage of the microgrid, $\delta V$ is a secondary control signal, $\delta V_i$ is a local secondary control variable whose dynamics is designed to track the central secondary control signal $\delta V$, and $b_i$ is binary variable indicating whether node i is a leading node in the consensus network.

8. The controller of claim 1, wherein the controller employs virtual impedance to adjust line R/X (line resistance/line reactance) influences and mitigate asymmetrical line impedance.

9. A method for controlling a microgrid system comprising:

controlling at least one of real power and reactive power amongst distributed generators of a microgrid using a primary consensus control employing at least one hardware processor to exchange reactive power information between each neighboring distributed generator of the microgrid so that each distributed generator has a proportion of total power in the microgrid;

wherein the primary consensus control comprises a control algorithm:

where $\dot{V}_i$ is a magnitude of output voltage for an ith distributed generator, $N_i$ is neighboring buses of bus i, $Q_j$ reactive power output at a jth distributed generator, $Q_i$ reactive power output at an ith distributed generator, $D_{q,i}$ is the multiplicative inverse of the reactive power droop coefficient for the ith distributed generator, and $D_{q,j}$ is the multiplicative inverse of the reactive power droop coefficient for the jth distributed generator; and maintaining a nominal value of at least one of voltage and frequency in the microgrid using a secondary consensus control.

10. The method of claim 9, wherein the distributed generators comprise hydro power, biomass or biogas power, wind power, geothermal power, cogeneration using steam turbines, natural gas-fired power, fuel cells, micro-turbines or reciprocating engines to turn generators or combinations thereof.

11. The method of claim 9, wherein the primary consensus control is integrated into a reactive power voltage (Q-V) droop control.

12. The method of claim 9, wherein the primary consensus control exchanges the reactive power information between each neighboring distributed generator of the microgrid to ensure that reactive power sharing between said each distributed generator of the microgrid is exact so that each distributed generator within the microgrid has an equal proportion of total power.

13. The method of claim 9, wherein the primary consensus control exchanges a droop coefficient of each distributed generator and a neighboring distributed generator of the microgrid.

14. The method of claim 9, wherein the at least one distributed generator of a microgrid causes fluctuation of the voltage and frequency in the microgrid, and the secondary consensus control restores at least one of voltage and frequency in the microgrid to said nominal value that is preset.

15. The method of claim 9, wherein the secondary control module exchanges voltage information at each distributed generator with its neighboring distributed generator within the microgrid.

16. A computer program product is provided that includes a non-transitory computer readable storage medium having computer readable program code embodied therein for a method of controlling a microgrid system, the method comprising:

controlling at least one of real power and reactive power amongst distributed generators of a microgrid using a primary consensus control employing at least one hardware processor to exchange reactive power information between each neighboring distributed generator of microgrid so that each distributed generator has a proportion of total power in the microgrid;

wherein the primary consensus control comprises a control algorithm:

where $\dot{V}_i$ is a magnitude of output voltage for an ith distributed generator, $N_i$ is neighboring buses of bus i, $Q_j$ reactive power output at a jth distributed generator, $Q_i$ reactive power output at an ith distributed generator, $D_{q,i}$ is the multiplicative inverse of the reactive power droop coefficient for the ith distributed generator, and $D_{q,j}$ is the multiplicative inverse of the reactive power droop coefficient for the jth distributed generator; and maintaining a nominal value of at least one of voltage and frequency in the microgrid using a secondary consensus control.

17. The computer program product of claim 16, wherein the primary consensus control exchanges reactive power information between each distributed generator of the microgrid and a neighboring distributed generator of the microgrid to ensure that reactive power sharing between said each distributed generator of the microgrid is exact so that each distributed generator within the microgrid has an equal proportion of total power.

18. The computer program product of claim 16, wherein the primary consensus control is integrated into a reactive power voltage (Q-V) droop control.

19. The computer program product of claim 16, wherein the secondary control module exchanges voltage information at each distributed generator with its neighboring distributed generator within the microgrid.

* * * * *